United States Patent
Li (10) Patent No.: US 7,239,726 B2
(45) Date of Patent: Jul. 3, 2007

(54) SYSTEM AND METHOD FOR EFFECTIVELY EXTRACTING FACIAL FEATURE INFORMATION

(75) Inventor: Pingshan Li, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 748 days.

(21) Appl. No.: 10/314,700

(22) Filed: Dec. 9, 2002

(65) Prior Publication Data

US 2003/0108225 A1 Jun. 12, 2003

Related U.S. Application Data

(60) Provisional application No. 60/340,576, filed on Dec. 12, 2001.

(51) Int. Cl.
*G06K 9/00* (2006.01)

(52) U.S. Cl. .................................. 382/118; 382/117

(58) Field of Classification Search ............... 382/117, 382/118
See application file for complete search history.

(56) References Cited

U.S. PATENT DOCUMENTS

| | | | |
|---|---|---|---|
| 5,450,504 A * | 9/1995 | Calia ........................... | 382/118 |
| 5,680,481 A * | 10/1997 | Prasad et al. ................ | 382/190 |
| 5,859,921 A * | 1/1999 | Suzuki ........................ | 382/118 |
| 5,878,156 A * | 3/1999 | Okumura .................... | 382/118 |
| 5,905,807 A * | 5/1999 | Kado et al. .................. | 382/118 |
| 5,933,527 A * | 8/1999 | Ishikawa ..................... | 382/190 |
| 5,982,912 A * | 11/1999 | Fukui et al. ................. | 382/118 |
| 6,091,836 A * | 7/2000 | Takano et al. ............... | 382/118 |
| 6,094,498 A * | 7/2000 | Okumura ..................... | 382/118 |
| 6,236,749 B1 * | 5/2001 | Satonaka et al. ............ | 382/154 |
| 6,332,038 B1 * | 12/2001 | Funayama et al. .......... | 382/190 |
| 6,526,161 B1 * | 2/2003 | Yan ............................. | 382/118 |
| 6,826,300 B2 * | 11/2004 | Liu et al. .................... | 382/159 |
| 2003/0016846 A1 * | 1/2003 | Chen et al. .................. | 382/117 |
| 2003/0021448 A1 * | 1/2003 | Chen et al. .................. | 382/117 |
| 2003/0053664 A1 * | 3/2003 | Pavlidis et al. ............. | 382/117 |

OTHER PUBLICATIONS

Hara et al.; "Automatic Feature Extraction of Facial Organs and Contour", IEEE International Workshop on Robot and Human Communication, 1997.*
Nikolaidis et al.; "Facial Feature Extraction using Adaptive Hough Transform, Template Macthing and Active Contour Models", IEEE, 1997.*
MathWorld; "Rotation Matrix", http://mathworld.wolfram.com/RotationMatrix.html.*
Fukui et al.; "Facial Feature Point Extraction Method Based on Combination of Shape Extraction and Pattern Matching", Systems and Computers in Japan, vol. 29, No. 6, 1998.*

* cited by examiner

*Primary Examiner*—Bhavesh M Mehta
*Assistant Examiner*—Jordan Kuhn
(74) *Attorney, Agent, or Firm*—Gregory J. Koerner; Redwood Patent Law (57) ABSTRACT

A system and method for effectively extracting facial feature information from image data may include a facial feature detector configured to generate facial feature information. The facial feature detector may perform an eye-area vertical projection procedure for generating eye information and eyebrow information. The facial feature detector may utilize an eyebrow filter to detect eyebrow location coordinates and eyebrow slope characteristics. Similarly, the facial feature detector may utilize an iris filter to detect iris location coordinates. The facial feature detector may also perform a mouth-area vertical projection procedure for generating corresponding nose/nostril location information and mouth/lip location information.

42 Claims, 8 Drawing Sheets

SYSTEM AND METHOD FOR EFFECTIVELY EXTRACTING FACIAL FEATURE INFORMATION

CROSS-REFERENCE TO RELATED APPLICATIONS

This application relates to, and claims priority in, U.S. Provisional Patent Application Ser. No. 60/340,576, entitled "Facial Feature Extraction," filed on Dec. 12, 2001. The foregoing related application is commonly assigned, and is hereby incorporated by reference.

BACKGROUND SECTION

1. Field of the Invention

This invention relates generally to techniques for analyzing information, and relates more particularly to a system and method for effectively extracting facial feature information.

2. Description of the Background Art

Implementing effective methods for analyzing information is a significant consideration for designers and manufacturers of contemporary electronic devices. However, effectively analyzing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes and manipulates digital image data may benefit from an efficient implementation because of the large amount and complexity of the digital data involved.

Due to growing demands on system resources and substantially increasing data magnitudes, it is apparent that developing new techniques for analyzing information is a matter of concern for related electronic technologies. Therefore, for all the foregoing reasons, developing effective systems for analyzing information remains a significant consideration for designers, manufacturers, and users of contemporary electronic devices.

SUMMARY

In accordance with the present invention, a system and method are disclosed for effectively extracting facial feature information. In one embodiment, a face detector module or other appropriate entity may perform an initial face detection procedure to convert image data into a gray-scale image, and to then generate approximate location information for a subject face in the image data. A facial feature detector or other appropriate entity may then perform a face rotation procedure to vertically align the subject face from the converted image data.

The facial feature detector or other appropriate entity may detect an eye areas in the image data, and may create an eye-area windows around the detected eye areas. Next, the facial feature detector or other appropriate entity may perform eye-area vertical projection procedures upon pixels within the eye-area windows to generate corresponding eye-area vertical projection histograms. The facial feature detector or other appropriate entity may utilize an eyebrow filter to accurately determine location coordinates and slope angles of eyebrows in the subject face. Similarly, the facial feature detector or other appropriate entity may utilize an iris filter to accurately determine location coordinates of the iris areas from the subject face.

Concurrently, the facial feature detector or other appropriate entity may detect a mouth area in the image data, and may create a mouth-area window around the detected mouth area. Next, the facial feature detector or other appropriate entity may perform a mouth-area vertical projection procedure upon pixels within the mouth-area window to generate a corresponding mouth-area vertical projection histogram. The facial feature detector or other appropriate entity may analyze the mouth-area vertical projection histogram to accurately determine location coordinates of the nose/nostrils in the subject face. Similarly, the facial feature detector or other appropriate entity may analyze the mouth-area vertical projection histogram to accurately determine location coordinates of the mouth/lips in the subject face.

Finally, a face recognition module may utilize the facial feature information generated by the foregoing process to perform a face recognition procedure in accordance with the present invention. In certain embodiments, the face recognition module may calculate similarity between two given faces by calculating an absolute difference between each corresponding facial feature parameter, and then by calculating a sum of the weighted differences. The sum of the weighted differences may be utilized as a score to measure similarity between the two faces.

The foregoing recognition parameters may include a distance between irises (with a subject face normalized/rescaled to a standard approximate size), an averaged eyebrow slope angle, a distance between corresponding eyebrows and irises, and a distance between the eyeline and mouth (where the eyeline is a line between the two irises). The present invention thus provides an improved system and method for effectively extracting facial feature information.

DETAILED DESCRIPTION

The present invention relates to an improvement in information analysis techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for effectively extracting facial feature information, and may include a facial feature detector that is configured to generate facial feature information. The facial feature detector may perform an eye-area vertical projection procedure for generating eye information and eyebrow information. The facial feature detector may utilize an eyebrow filter to detect eyebrow location coordinates and eyebrow slope characteristics. Similarly, the facial feature detector may utilize an iris filter to detect iris location coordinates. The facial feature detector may also perform a mouth-area vertical projection procedure for generating corresponding nose/nostril location information and mouth/lip location information.

Figure 1:
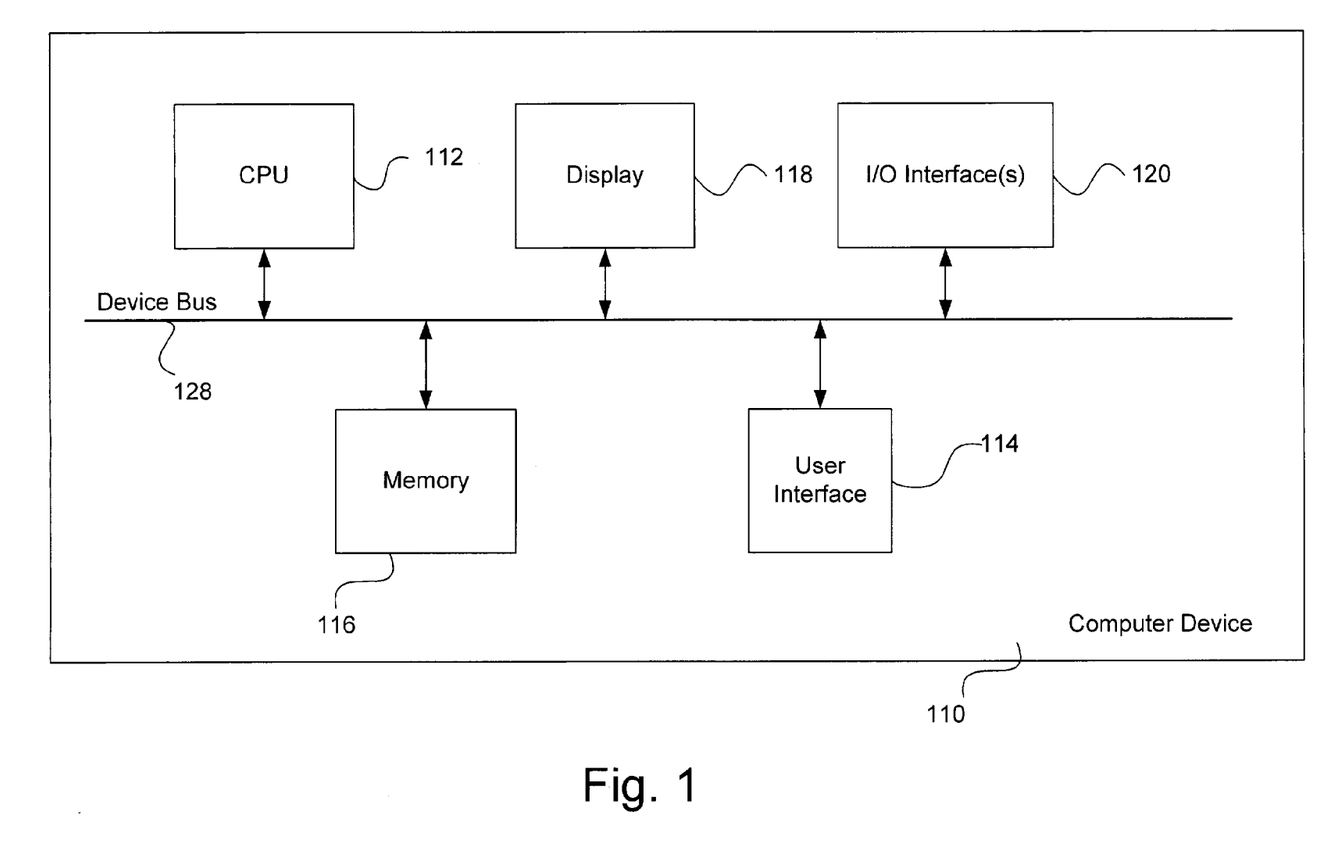
FIG. 1 is a block diagram of a computer device, in accordance with one embodiment of the present invention.

Referring now to FIG. 1, a block diagram for one embodiment of a computer device 110 is shown, in accordance with the present invention. In the FIG. 1 embodiment, computer device 110 preferably includes, but is not limited to, a central processing unit (CPU) 112, a user interface 114, memory 116, a display 118, and input/output interface(s) (I/O interface(s)) 120. The foregoing components of computer device 110 may preferably be coupled to, and communicate through, a device bus 128.

In alternate embodiments, computer device 110 may readily be implemented using various components and configurations in addition to, or instead of, those discussed in conjunction with the FIG. 1 embodiment. Furthermore, the present invention may readily be performed by various types of electronic devices other than computer device 110.

In the FIG. 1 embodiment, CPU 112 may be implemented to include any appropriate and compatible microprocessor device that preferably executes software instructions to thereby control and manage the operation of image manager 110. The FIG. 1 display 118 preferably may include any effective type of display technology including a cathode-ray-tube monitor or a liquid-crystal display device. In the FIG. 1 embodiment, I/O interface(s) 120 preferably may include one or more input and/or output interfaces to receive and/or transmit any required types of relevant information by image manager 110.

In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 and 3. In the FIG. 1 embodiment, user interface 114 preferably may include any effective means to allow a system user to communicate with image manager 110. For example, user interface 114 may support a keyboard device, a wireless remote control device, a speech-recognition module with corresponding microphone, or a graphical user interface with touch-screen capability.

Figure 2:
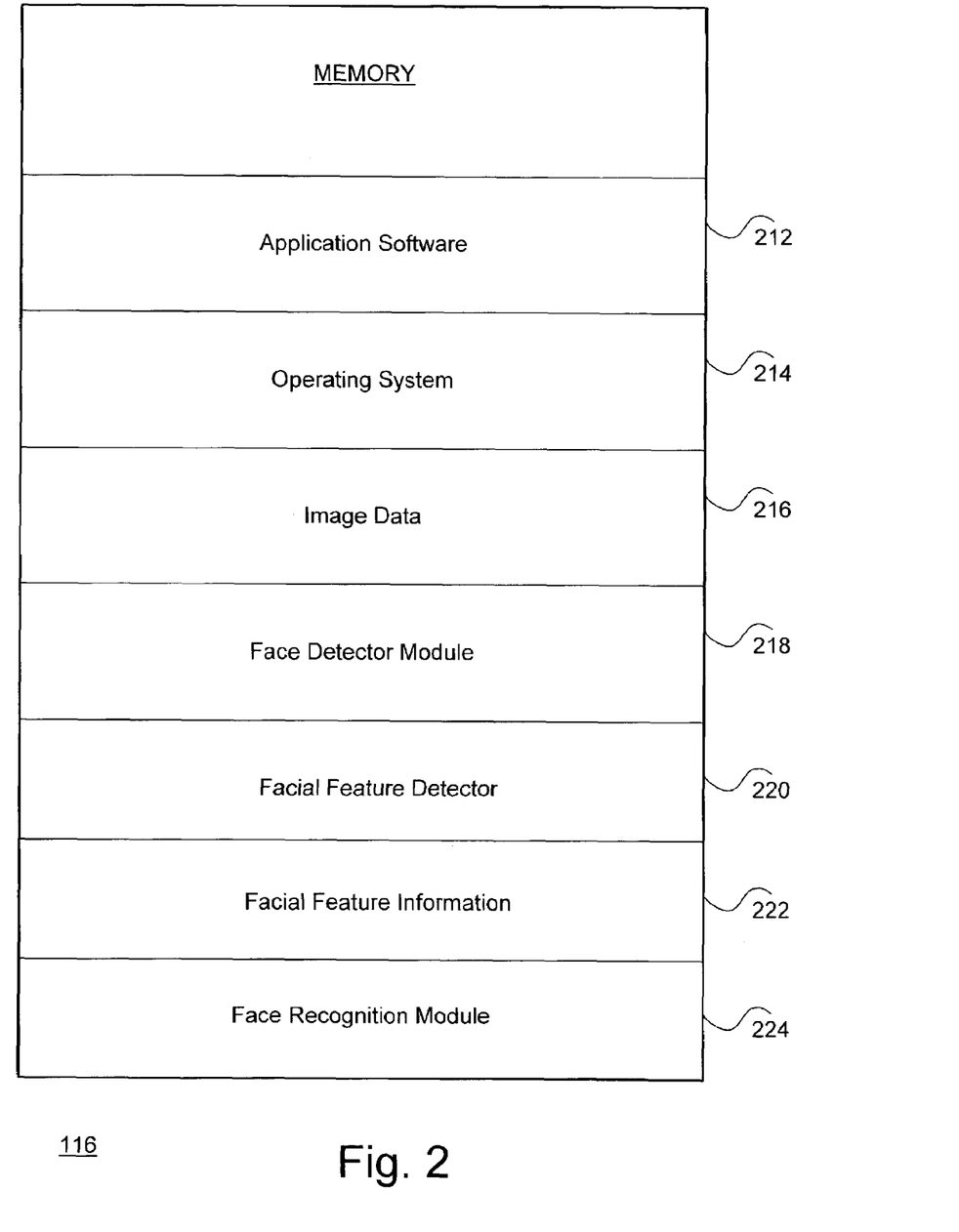
FIG. 2 is a block diagram of the memory of FIG. 1, in accordance with one embodiment of the present invention.

Referring now to FIG. 2, a block diagram for one embodiment of the FIG. 1 memory 116 is shown, in accordance with the present invention. In the FIG. 2 embodiment, memory 116 preferably includes, but is not limited to, application software 212, an operating system 214, image data 216, a face detector module 218, a facial feature detector 220, facial feature information 222, and a face recognition module 224. In alternate embodiments, memory 116 may readily include various other components in addition to, or instead of, those components discussed in conjunction with the FIG. 2 embodiment.

In the FIG. 2 embodiment, application software 212 may include program instructions that are preferably executed by CPU 112 (FIG. 1) to perform various functions and operations for computer device 110. The particular nature and functionality of application software 212 preferably varies depending upon factors such as the specific type and particular use of the corresponding computer device 110. In the FIG. 2 embodiment, operating system 214 preferably controls and coordinates low-level functionality of image manager 110.

Image data 216 preferably includes various types of data that is preferably stored in memory 116. Image data 216 preferably may include various types of captured image data or other types of information. For example, in certain embodiments, image data 216 may include one or more images that a system user obtains from an external source such as the Internet. In alternate embodiments, the present invention may readily be utilized to analyze data other than the image data 216 shown in FIG. 2.

Face detector module 218 may be utilized to perform an initial face detection procedure upon image data to generate an approximate location of any detected face(s). In the FIG. 2 embodiment, facial feature detector 220 may preferably be utilized to analyze various types of image data 216 to thereby extract corresponding facial feature information 222. One embodiment for extracting facial feature information 222 is further discussed below in conjunction with FIGS. 3 through 8. Face recognition module 224 may then advantageously utilize facial feature information 222 to perform various appropriate face recognition procedures, in accordance with the present invention.

Figure 3:
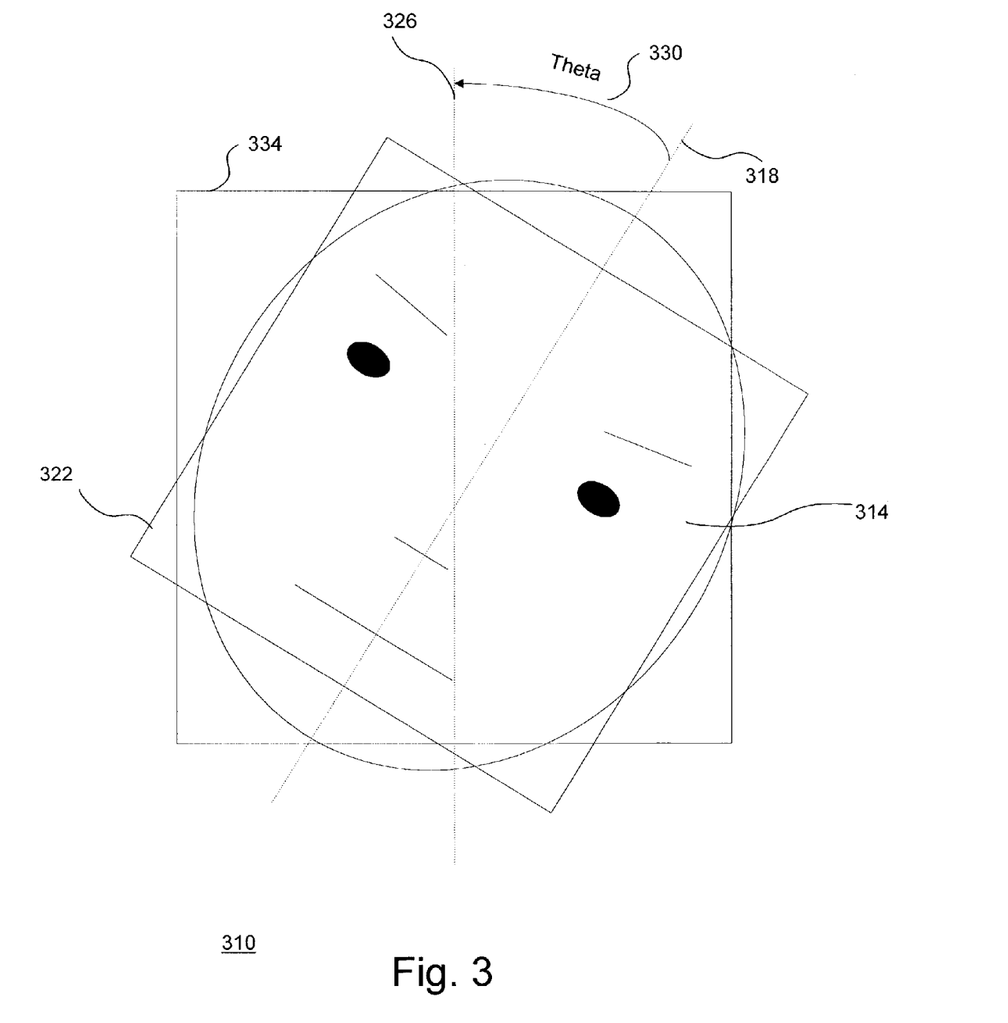
FIG. 3 is a diagram illustrating a face rotation procedure, in accordance with one embodiment of the present invention.

Referring now to FIG. 3, a block diagram 310 illustrating a face rotation procedure is shown, in accordance with one embodiment of the present invention. In alternate embodiments, the present invention may readily perform face rotation procedures that include various other techniques or steps in addition to, or instead of, those techniques and steps discussed in conjunction with the FIG. 3 embodiment.

In accordance with the present invention, facial feature detector 220 (FIG. 2) or other appropriate entity may initially perform a face rotation procedure upon image data 216 to realign all rotated subject faces in a vertical alignment that permits pixel location coordinates to correspond between various subject faces in image data 216. Facial feature detector 220 may perform the foregoing face rotation procedure by utilizing any effective techniques.

In the FIG. 3 example, a face 314 is shown as being aligned along a non-vertical axis 318. Also shown in the FIG. 3 example is a vertical axis 326. In accordance with the present invention, a face detector module 218 may initially access image data 216 and convert the image data 216 into a gray scale image. Face detector module 218 may then perform a face detection procedure for analyzing the converted image data 216 to generate approximate location information for any faces in image data 216. The approximate location information may include approximate coordinates for eye areas and mouth areas.

In the FIG. 3 example, facial feature detector 220 may then create a non-vertical face window 322 around face 314. In certain embodiments, non-vertical face window 322 may be implemented with a width of "3M" and a height of "3M"

where "M" is a distance between eye areas in face 314. Facial feature detector 220 may then determine a rotation angle theta (θ) 330 that is necessary to rotate face 314 in non-vertical face window 322 from alignment with non-vertical axis 318 to a vertical face window 334 that is aligned with vertical axis 326.

In certain embodiments, facial feature detector 220 may calculate new coordinates for each pixel in non-vertical face 314 by utilizing the following rotation matrix formula:

$$\begin{bmatrix} X_2 \\ Y_2 \end{bmatrix} = \begin{bmatrix} \cos\theta & -\sin\theta \\ \sin\theta & \cos\theta \end{bmatrix} \begin{bmatrix} X_1 \\ Y_1 \end{bmatrix}$$

where $X_1$ and $Y_1$ are non-rotated coordinates in a non-vertical face window 322, $X_2$ and $Y_2$ are rotated coordinates in a vertical face window 334, and theta (θ) is an angle of rotation.

Furthermore, in certain embodiments, facial feature detector 220 may decompose the foregoing rotation matrix formula into a series of three one-dimensional translations in accordance with the following formula:

$$\begin{bmatrix} \cos\theta & -\sin\theta \\ \sin\theta & \cos\theta \end{bmatrix} = \begin{bmatrix} 1 & -\tan\frac{\theta}{2} \\ 0 & 1 \end{bmatrix} \begin{bmatrix} 1 & 0 \\ \sin\theta & 1 \end{bmatrix} \begin{bmatrix} 1 & -\tan\frac{\theta}{2} \\ 0 & 1 \end{bmatrix}$$

where a first matrix moves pixels in a horizontal direction, a second matrix moves pixels in a vertical direction, and a third matrix again moves pixels in a horizontal direction.

Figure 4:
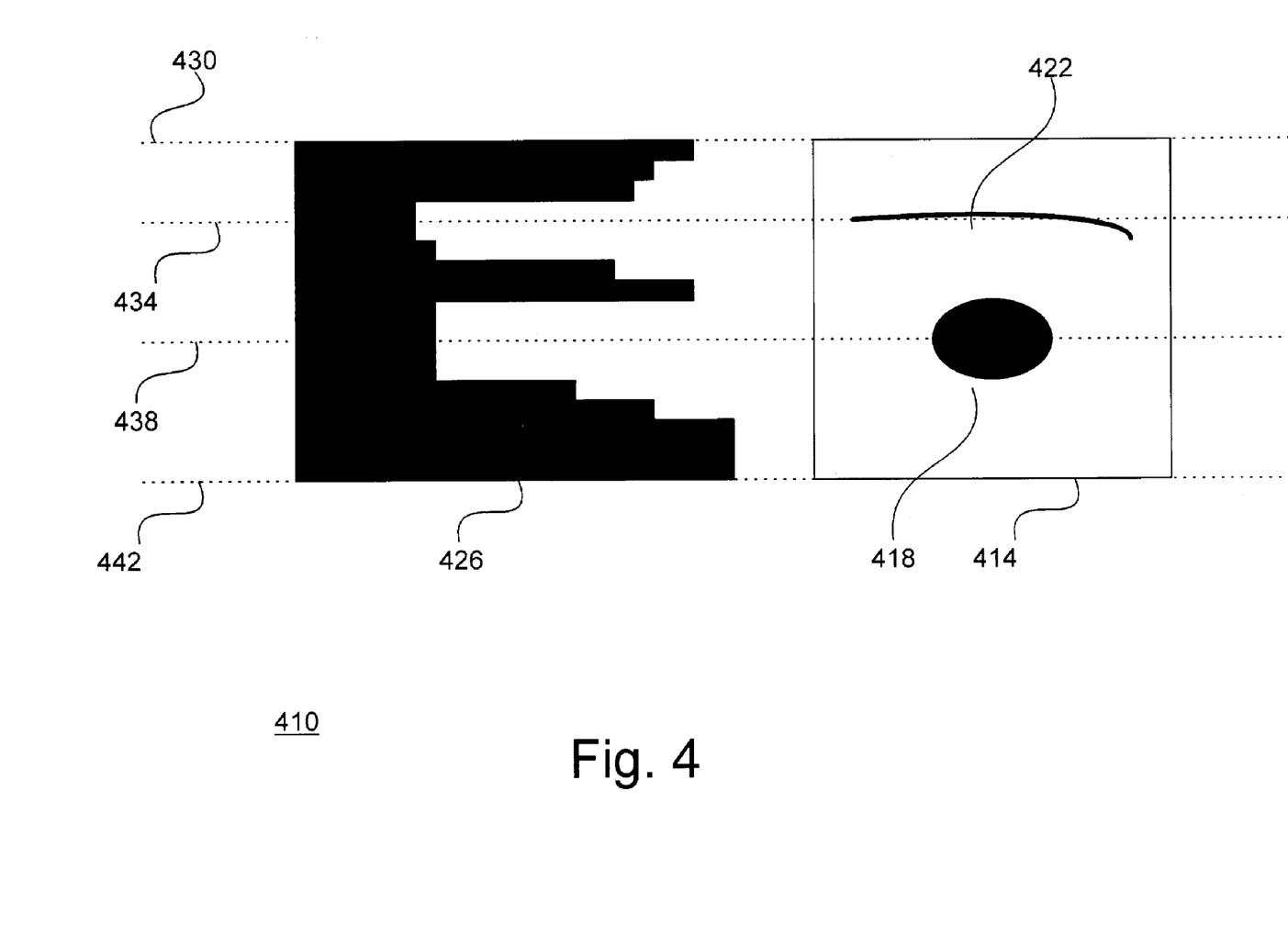
FIG. 4 is a diagram illustrating an eye-area vertical projection procedure, in accordance with one embodiment of the present invention.

Referring now to FIG. 4, a diagram 410 illustrating an eye-area vertical projection procedure is shown, in accordance with one embodiment of the present invention. The FIG. 4 example is presented for purposes of illustration, and, in alternate embodiments, the present invention may readily utilize various steps and techniques other than those discussed in conjunction with the FIG. 4 embodiment.

In the FIG. 4 embodiment, facial feature detector 220 may initially create an eye-area window 414 around an approximate eye area in face 314 that includes an eye 418 and an eyebrow 422. In certain embodiments, eye-area window 414 may be implemented with a width of "M" and a height of "M" where "M" is an approximate distance between eye areas in face 314.

In the FIG. 4 embodiment, facial feature detector 220 may then perform the eye-area vertical projection procedure by summing gray-scale values of pixels in each horizontal line of eye-area window 418 to produce a vector and corresponding histogram 426 which represents the results of the eye-area vertical projection procedure. In the FIG. 4 embodiment, darker pixels have lower values, and lighter pixels have higher values, so therefore a larger horizontal histogram bar in histogram 426 represents a larger total pixel value (greater average brightness) for a corresponding horizontal line in eye-area window 414.

Therefore, in accordance with the present invention, facial feature detector 220 or other appropriate entity may then identify a first low-amplitude point in histogram 426 as corresponding to the relatively dark pixels of an eyebrow region along axis 434. Similarly, facial feature detector 220 or other appropriate entity may also identify a second low-amplitude point in histogram 426 as corresponding to the relatively dark pixels of an eye region along axis 438.

Facial feature detector 220 may then perform a similar procedure for the other eye area of face 314.

In certain embodiments, a correct separator area defining the distance between the low-amplitude points along axis 434 (eyebrow area) and axis 438 (eye area) of histogram 426 may be determined by selecting a maximum separator merit value from among separator merit values corresponding to respective separator area candidates according to the following formula:

Merit Value=Separator Candidate Value−10 (Eyebrow Value−Eye Value)

wherein the "Eyebrow Value" is one of the low-amplitude points adjacent to axis 434, the "Eye Value" is one of the low-amplitude points adjacent to axis 438, and the "Separator Candidate Value" represents a distance between one of the low-amplitude points adjacent to axis 434 (eyebrow area) and one of the low-amplitude points adjacent to axis 438 (eye area). In addition, in certain circumstances, histogram 426 may exhibit only one low-amplitude point. In accordance with the present invention, facial feature detector 220 may then identify that single low-amplitude point as corresponding to eye 418.

Figure 5:
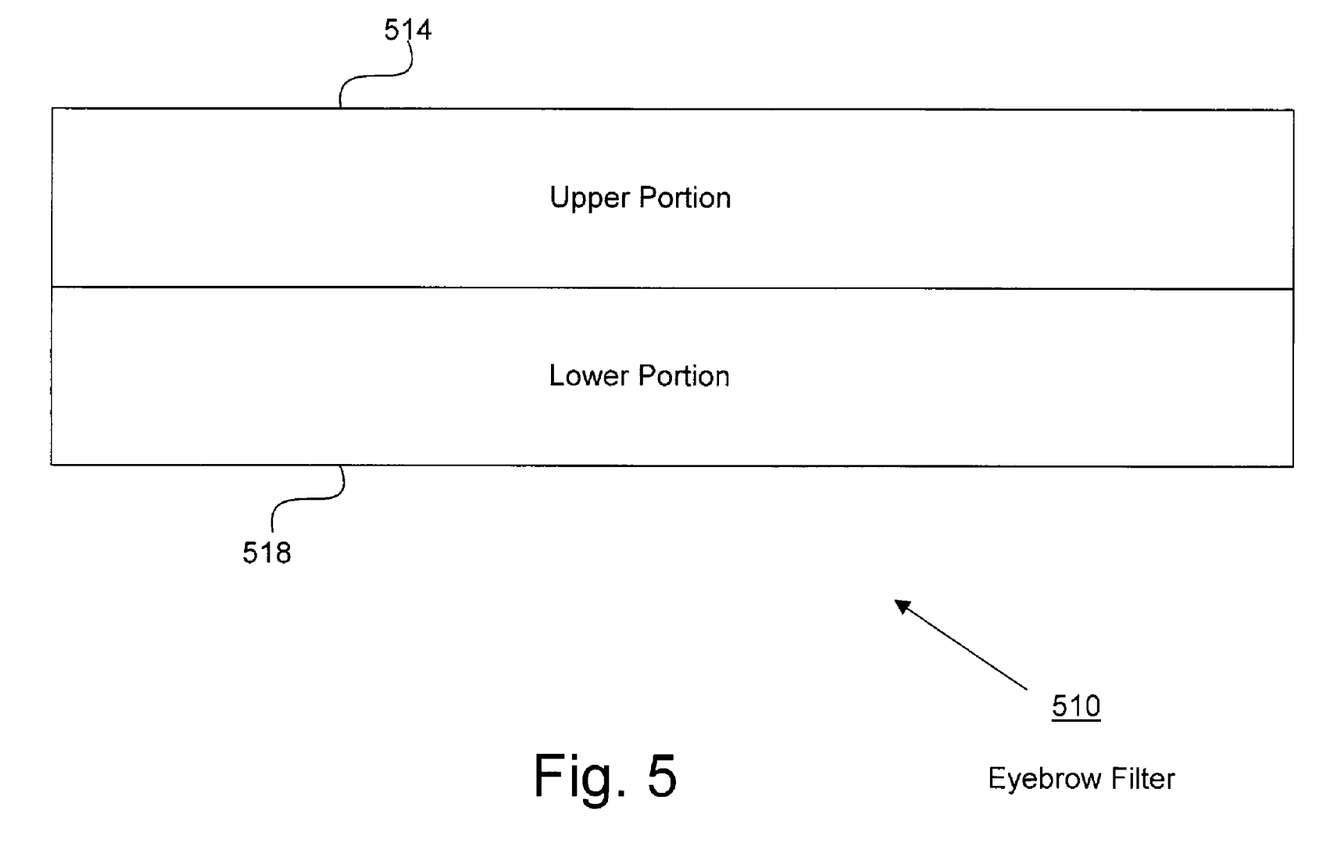
FIG. 5 is a block diagram of an eyebrow filter, in accordance with one embodiment of the present invention.

Referring now to FIG. 5, a block diagram of an eyebrow filter 510 is shown, in accordance with one embodiment of the present invention. In alternate embodiments, eyebrow filter 510 may be implemented in various other manners in addition to, or instead of, those discussed in conjunction with the FIG. 5 embodiment.

In the FIG. 5 embodiment, facial feature detector 220 may utilize eyebrow filter 510 to detect the upper edge and the slope angle of eyebrow 422 (FIG. 4). In the FIG. 5 embodiment, eyebrow filter 510 may be implemented to have a filter width of "M" and a filter height of "M/4", where "M" is the approximate distance between the two eyes of face 314.

Facial feature detector 220 may move eyebrow filter 510 pixel by pixel to different locations in an eyebrow area of eye-area window 414. At each location, facial feature detector 220 may add all pixel values in upper portion 514 to produce an upper value, and may also add all pixel values in lower portion 518 to produce a lower value. Facial feature detector 220 may then subtract each lower value from each upper value to produce a local eyebrow value for the corresponding position of eyebrow filter 510.

In certain embodiments, eyebrow filter 510 may also be tilted to calculate similar tilted local eyebrow values. In accordance with the present invention, facial feature detector 220 may then select the maximum local eyebrow value to accurately detect the position and slope angle of a corresponding eyebrow 422. The foregoing eyebrow detection procedure may similarly be performed upon the other eye of face 314. In certain embodiments, an average slope angle may be calculated from the individual slope angles of each eyebrow of face 314.

Figure 6:
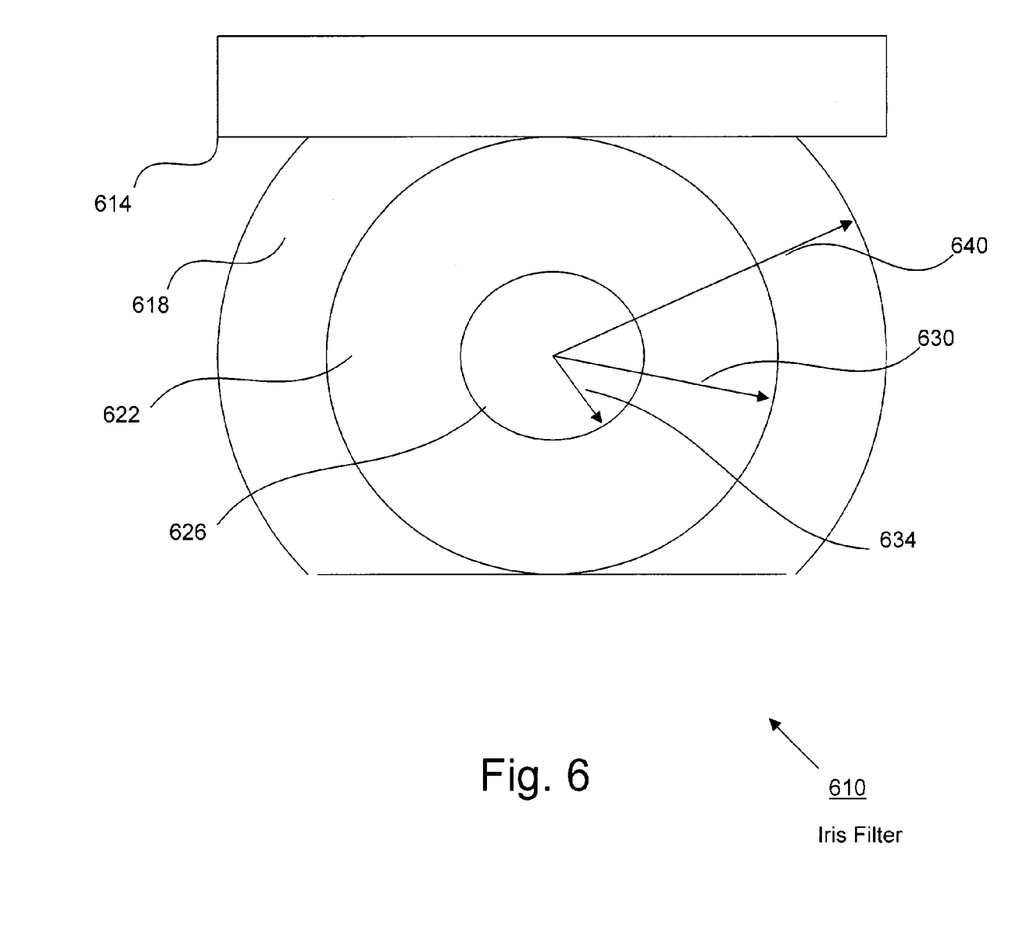
FIG. 6 is a diagram of an iris filter, in accordance with one embodiment of the present invention.

Referring now to FIG. 6, a diagram of an iris filter 610 is shown, in accordance with one embodiment of the present invention. The FIG. 6 embodiment is presented for purposes of illustration, and in alternate embodiments, iris filter 610 may be implemented in various other manners in addition to, or instead of, those discussed in conjunction with the FIG. 6 embodiment.

In accordance with the present invention, facial feature detector 220 may utilize iris filter 610 to detect the iris 622 of eye 418 (FIG. 4). In the FIG. 6 embodiment, iris filter 610 may be implemented to include an iris area 622 with a radius "r" 630 that is approximately equal to 0.09×"M", where "M"

is the distance between the eyes in face 314. In the FIG. 6 embodiments, iris filter 610 may similarly be implemented with a pupil area 626 with a radius 634 that is approximately equal to "r/2", and with a white area 618 with a radius 640 that is approximately equal to "1.5×r", where "r" is the foregoing radius 630 of iris area 622.

In the FIG. 6 embodiment, facial feature detector 220 may move iris filter 610 pixel by pixel to different locations in an eye area of eye-area window 414. At each location, facial feature detector 220 may generate a white-area value that is equal to the sum all pixel values in the white area 618 of eye 314. Facial feature detector 220 may also generate an eyelid value that is equal to the sum all pixel values in the eyelid area 614 of eye 314. In addition, facial feature detector 220 may generate an iris value that is equal to the sum all pixel values in the iris area 622 of eye 314.

At each location, facial feature detector 220 may calculate an iris merit value in accordance with the following formula:

Iris Merit Value=(2×white-area value)−(3×eyelid value)−(6×iris value)

In accordance with the present invention, facial feature detector 220 may then select the maximum iris merit value to accurately detect the position of a corresponding iris area 622. The foregoing iris detection procedure may similarly be performed upon the other eye of face 314.

Figure 7:
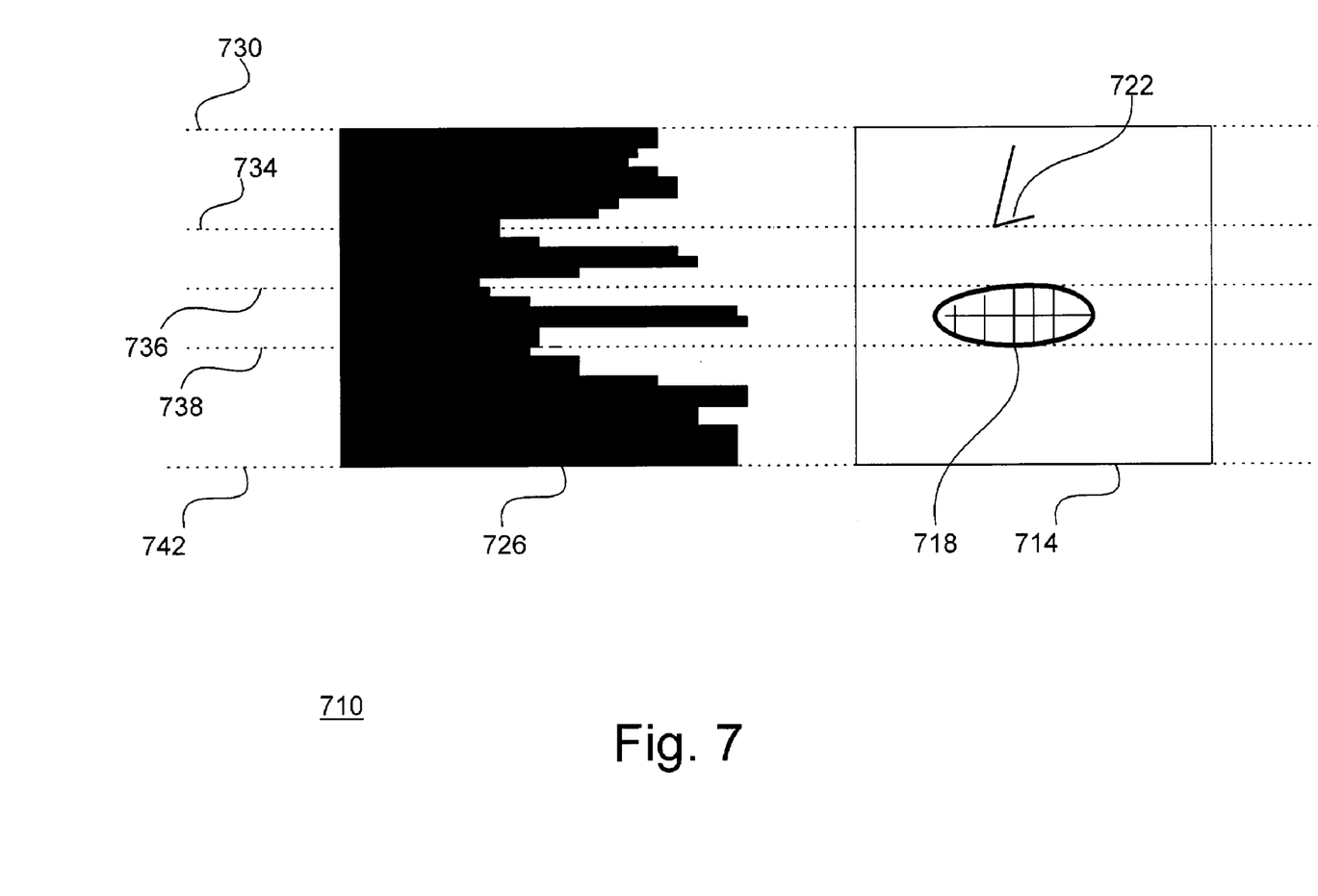
FIG. 7 is a diagram illustrating a mouth-area vertical projection procedure, in accordance with one embodiment of the present invention.

Referring now to FIG. 7, a diagram 710 illustrating a mouth-area vertical projection procedure is shown, in accordance with one embodiment of the present invention. The FIG. 7 example is presented for purposes of illustration, and, in alternate embodiments, the present invention may readily utilize various steps and techniques other than those discussed in conjunction with the FIG. 7 embodiment.

In the FIG. 7 embodiment, facial feature detector 220 may initially create a mouth-area window 714 around an approximate mouth area in face 314 that includes a mouth 718 and a nose 722. In certain embodiments, mouth-area window 714 may be implemented with a width of "M" and a height of "M" where "M" is an approximate distance between eye areas in subject face 314.

In the FIG. 7 embodiment, facial feature detector 220 may then perform the mouth-area vertical projection procedure by summing gray-scale values of pixels in each horizontal line of mouth-area window 718 to produce a vector and corresponding histogram 726 which represents the results of the mouth-area vertical projection procedure. In the FIG. 7 embodiment, darker pixels have lower values, and lighter pixels have higher values, so therefore a larger horizontal histogram bar in histogram 726 represents a larger total pixel value (greater average brightness) for a corresponding horizontal line in mouth-area window 714.

Therefore, in accordance with the present invention, facial feature detector 220 or other appropriate entity may then identify a first low-amplitude point in histogram 726 as corresponding to the relatively dark pixels of a nose or nostril region 722 along axis 734. Similarly, facial feature detector 220 or other appropriate entity may also identify a second middle low-amplitude point in histogram 726 as corresponding to the relatively dark pixels of an upper lip region of lip 718 along axis 736.

In addition, facial feature detector 220 or other appropriate entity may identify a third low-amplitude point in histogram 726 as corresponding to the relatively dark pixels of a lower lip region of lip 718 along axis 738. Facial feature detector 220 may then perform a similar procedure for the other eye area of face 314. In certain circumstances in which teeth are not seen in face 314, histogram 426 may exhibit only two low-amplitude points which then are identified as corresponding to nose 722 and mouth 718, respectively.

Figure 8:
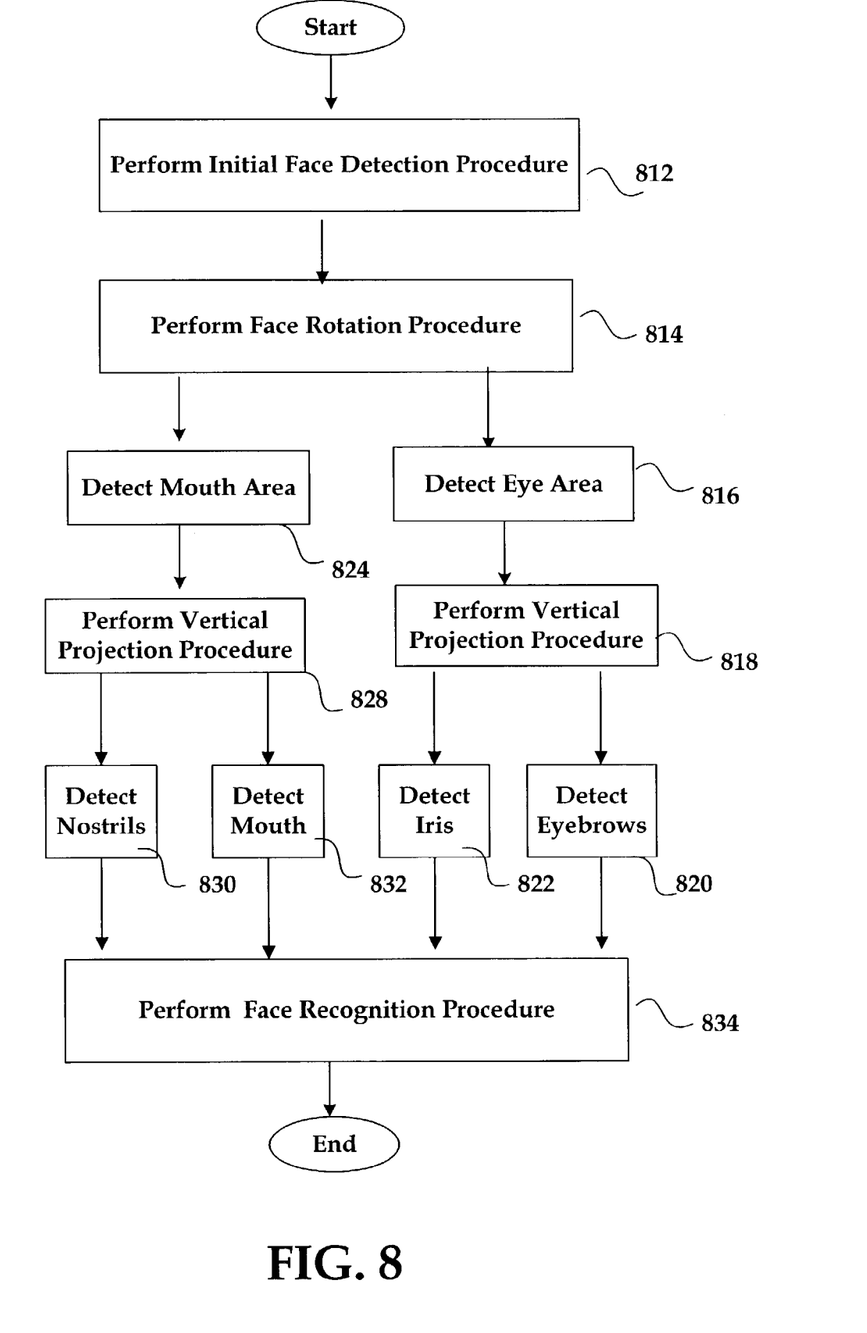
FIG. 8 is a flowchart of method steps for effectively performing a facial feature extraction procedure, in accordance with one embodiment of the present invention.

Referring now to FIG. 8, a flowchart of method steps for effectively performing a facial feature extraction procedure is shown, in accordance with one embodiment of the present invention. The FIG. 8 example is presented for purposes of illustration, and, in alternate embodiments, the present invention may readily utilize various other steps and sequences than those discussed in conjunction with the FIG. 8 embodiment.

In the FIG. 8 embodiment, in step 812, a face detector module 218 or other appropriate entity may perform an initial face detection procedure to convert image data 216 into a gray-scale image and to generate approximate location information for a face 314 in the image data 216. Then, in step 814, a facial feature detector 220 or other appropriate entity may perform a face rotation procedure to vertically align the face 314 in the converted image data 216.

In step 816, facial feature detector 220 or other appropriate entity may detect an eye area in image data 216, and may create an eye-area window 414 around the detected eye area. Next, in step 818, facial feature detector 220 or other appropriate entity may perform an eye-area vertical projection procedure upon pixels within the eye-area window 414 to generate a corresponding eye-area vertical projection histogram 426, as discussed above in conjunction with FIG. 4.

In step 820, facial feature detector 220 or other appropriate entity may utilize an eyebrow filter 510 to accurately determine coordinates and slope of eyebrows 422 in face 314. Similarly, in step 822, facial feature detector 220 or other appropriate entity may utilize an iris filter 610 to accurately determine coordinates of the iris areas 622 in face 314.

Concurrently, in step 824, facial feature detector 220 or other appropriate entity may detect a mouth area in image data 216, and may create a mouth-area window 714 around the detected mouth area. Next, in step 828, facial feature detector 220 or other appropriate entity may perform a mouth-area vertical projection procedure upon pixels within the mouth-area window 714 to generate a corresponding mouth-area vertical projection histogram 716, as discussed above in conjunction with FIG. 7.

In step 830, facial feature detector 220 or other appropriate entity may analyze mouth-area vertical projection histogram 726 to accurately determine coordinates of the nose/nostrils in face 314. Similarly, in step 832, facial feature detector 220 or other appropriate entity may analyze mouth-area vertical projection histogram 726 to accurately determine coordinates of the mouth/lips in face 314.

Finally, in step 834, a face recognition module 224 may utilize facial feature information 222 generated by the foregoing process of FIG. 8 (as well as with other similar techniques) to perform a face recognition procedure in accordance with the present invention. In the FIG. 8 embodiment, face recognition module 224 may calculate similarity between two given faces by calculating an absolute difference between each corresponding facial feature parameter, and then by calculating a sum of the weighted differences. The sum of the weighted differences may be utilized as a score to measure similarity between the two faces.

In certain embodiments, the foregoing recognition parameters may include a distance between irises (with different faces normalized/rescaled to the same relative size), an averaged eyebrow angle, a distance between corresponding eyebrows and irises, and a distance between the eyeline and mouth (where the eyeline is a line between the two irises). The present invention thus provides an improved system and method for effectively extracting facial feature information for use in face recognition.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively analyzing image data, comprising:
a facial feature detector configured to generate facial feature information by analyzing said image data, said facial feature information including eye-area information and mouth-area information, said facial feature detector performing an eye-area vertical projection procedure for generating said eye-area information, said facial feature detector also separately performing a mouth-area vertical projection procedure for generating said mouth-area information, said facial feature detector further utilizing a feature filter to refine said facial feature information for a facial feature, said feature filter having a plurality of segments that collectively are shaped to represent said facial feature, said facial feature detector moving said feature filter over pixels of said image data to repeatedly calculate feature merit values from said pixels currently aligned with said feature filter, said feature merit values being determined by calculating sums of pixel values corresponding with each of said segments and then calculating a weighted difference of said sums, an optimal one of said feature merit values accurately locating said facial feature in said image data; and
a processor configured to control said facial feature detector to thereby effectively analyze said image data.

2. The system of claim 1 wherein a face detector module performs an initial face detection procedure to convert said image data into a gray-scale format, said face detector module then generating approximate location information for a subject face in said image data.

3. The system of claim 2 wherein said facial feature detector performs a face rotation procedure upon said subject face in said image data to realign said subject face in a vertical alignment.

4. The system of claim 3 wherein said facial feature detector calculates rotated coordinates for pixels in said subject face by utilizing a rotation matrix formula:

$$\begin{bmatrix} X_2 \\ Y_2 \end{bmatrix} = \begin{bmatrix} \cos\theta & -\sin\theta \\ \sin\theta & \cos\theta \end{bmatrix} \begin{bmatrix} X_1 \\ Y_1 \end{bmatrix}$$

where $X_1$ and $Y_1$ are non-rotated coordinates in a non-vertical face window, $X_2$ and $Y_2$ are said rotated coordinates in a vertical face window, and $\theta$ is an angle of rotation, said facial feature detector decomposing said rotation matrix formula into a series of three one-dimensional translations according to a decomposed formula:

$$\begin{bmatrix} \cos\theta & -\sin\theta \\ \sin\theta & \cos\theta \end{bmatrix} = \begin{bmatrix} 1 & -\tan\frac{\theta}{2} \\ 0 & 1 \end{bmatrix} \begin{bmatrix} 1 & 0 \\ \sin\theta & 1 \end{bmatrix} \begin{bmatrix} 1 & -\tan\frac{\theta}{2} \\ 0 & 1 \end{bmatrix}$$

where a first matrix moves said pixels in an initial horizontal direction, a second matrix moves said pixels in a vertical direction, and a third matrix again moves said pixels in a final horizontal direction.

5. The system of claim 4 wherein said facial feature detector creates a mouth-area window around an approximate mouth area in said subject face, said mouth-area window including a nose and a mouth.

6. The system of claim 5 wherein said facial feature detector performs said mouth-area vertical projection procedure by summing gray-scale values of pixels in each horizontal line of said mouth-area window to produce a corresponding histogram which represents results of said mouth-area vertical projection procedure, said facial feature detector identifying a first low-amplitude point in said histogram as corresponding to pixels of a nostril region in said subject face, said facial feature detector also identifying a central second low-amplitude point in said histogram as corresponding to pixels of an upper lip region in said subject face, said facial feature detector further identifying a third low-amplitude point in said histogram as corresponding to pixels of a lower lip region in said subject face.

7. The system of claim 5 wherein said facial feature detector performs said mouth-area vertical projection procedure by summing gray-scale values of pixels in each horizontal line of said mouth-area window to produce a corresponding histogram which represents results of said mouth-area vertical projection procedure, said facial feature detector identifying a first low-amplitude point in said histogram as corresponding to pixels of an nostril region in said subject face, said facial feature detector also identifying a second low-amplitude point in said histogram as corresponding to pixels of a closed-mouth region in said subject face.

8. The system of claim 3 wherein said facial feature detector creates an eye-area window around an approximate eye area in said subject face, said eye-area window including an eye and an eyebrow.

9. The system of claim 8 wherein said eye-area window is implemented with a width of "M" and a height of "M" where "M" is an approximate distance between eye areas in said subject face.

10. The system of claim 8 wherein said facial feature detector performs said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face.

11. The system of claim 10 wherein said facial feature detector utilizes an eyebrow filter to detect an upper edge and a slope angle of said eyebrow from said subject face.

12. The system of claim 11 wherein said eyebrow filter is implemented to have a filter width of "M" and a filter height of "M/4", where "M" is an approximate distance between two eyes of said subject face.

13. The system of claim 10 wherein said facial feature detector utilizes an iris filter to detect coordinates for an iris region in said eye-area of said subject face.

14. The system of claim 8 wherein said histogram exhibits only one low-amplitude point, said facial feature detector then identifying said one low-amplitude point as corresponding to said eye region of said subject face.

15. The system of claim 1 wherein a face recognition module performs a face recognition procedure for two faces by calculating absolute differences between corresponding facial feature parameters, said face recognition module next applying weighting values to said absolute differences to produce weighted differences, said face recognition module then calculating a final sum of said weighted differences, said face recognition module utilizing said final sum as a score to measure a similarity between said two faces, said facial parameters including a distance between irises in a subject face which is normalized and rescaled to a standard size, an averaged eyebrow angle from eyebrows of said subject face, a distance between corresponding eyebrows and irises of said subject face, and a distance between an eyeline connecting two irises of said subject face and a mouth from said subject face.

16. A system for effectively analyzing image data, comprising:
a facial feature detector configured to generate facial feature information by analyzing said image data, said facial feature information including eye-area information and mouth-area information, said facial feature detector performing an eye-area vertical projection procedure for generating said eye-area information, said facial feature detector also separately performing a mouth-area vertical projection procedure for generating said mouth-area information, said facial feature detector further utilizing a feature filter to refine said facial feature information for a facial feature, said feature filter having a plurality of segments that collectively are shaped to represent said facial feature, said facial feature detector moving said feature filter over pixels of said image data to repeatedly calculate feature merit values from said pixels currently aligned with said feature filter, an optimal one of said feature merit values accurately locating said facial feature in said image data, a face detector module performing an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face,
said facial feature detector determining a correct separator area between said first low-amplitude point and said second low-amplitude point by selecting a maximum separator merit value of separator area candidates according to a formula:

Merit Value=Separator Candidate Value−10 (Eyebrow Value−Eye Value);

and a processor configured to control said facial feature detector to thereby effectively analyze said image data.

17. A system for effectively analyzing image data, comprising:
a facial feature detector configured to generate facial feature information by analyzing said image data, said facial feature information including eye-area information and mouth-area information, said facial feature detector performing an eye-area vertical projection procedure for generating said eye-area information, said facial feature detector also performing a mouth-area vertical projection procedure for generating said mouth-area information;
a face detector module that performs an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector utilizing an eyebrow filter to detect an upper edge and a slope angle of said eyebrow from said subject face, said eyebrow filter being implemented to have a filter width of "M" and a filter height of "M/4", where "M" is an approximate distance between two eyes of said subject face, said facial feature detector moving said eyebrow filter, pixel by pixel, to different locations of said eyebrow region in said eye-area window, said facial feature detector, at each of said different locations, adding all pixel values in an upper portion of said eyebrow filter to produce an upper value, said facial feature detector also adding all pixel values in a lower portion of said eyebrow filter to produce a lower value, said facial feature detector then subtracting said lower value from said upper value to produce a local eyebrow value for each corresponding position of said eyebrow filter, said facial feature detector then selecting a maximum local eyebrow value to accurately detect a position and a slope angle of a corresponding eyebrow; and
a processor configured to control said facial feature detector to thereby effectively analyze said image data.

18. The system of claim 17 wherein said facial feature detector tilts said eyebrow filter to calculate tilted local eyebrow values, said facial feature detector then selecting a maximum tilted local eyebrow value to accurately detect said slope angle of said eyebrow.

19. A system for effectively analyzing image data, comprising:
- a facial feature detector configured to generate facial feature information by analyzing said image data, said facial feature information including eye-area information and mouth-area information, said facial feature detector performing an eye-area vertical projection procedure for generating said eye-area information, said facial feature detector also performing a mouth-area vertical projection procedure for generating said mouth-area information;
- a face detector module that performs an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector utilizing an iris filter to detect coordinates for an iris region in said eye-area of said subject face, said iris filter being implemented to include an iris area with an iris radius "r" that is approximately equal to 0.09×"M", where "M" is an approximate distance between eyes in said subject face, said iris filter also being implemented with a pupil area having a pupil radius that is approximately equal to "r/2", where "r" is said iris radius, said iris filter further being implemented with a eye-white area having an eye-white radius that is approximately equal to "1.5×r", where "r" is said iris radius; and
- a processor configured to control said facial feature detector to thereby effectively analyze said image data.

20. A system for effectively analyzing image data, comprising:
- a facial feature detector configured to generate facial feature information by analyzing said image data, said facial feature information including eye-area information and mouth-area information, said facial feature detector performing an eye-area vertical projection procedure for generating said eye-area information, said facial feature detector also performing a mouth-area vertical projection procedure for generating said mouth-area information;
- a face detector module that performs an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector utilizing an iris filter to detect coordinates for an iris region in said eye-area of said subject face, said facial feature detector moving said iris filter, pixel by pixel, to different locations in an eye-area window around said eye area, said facial feature detector, at each of said different locations, generating a white-area value that is equal to a sum all pixel values in said eye-white area of said iris filter, said facial feature detector also generating an eyelid value that is equal to a sum all pixel values in an eyelid area of said iris filter, said facial feature detector further generating an iris value that is equal to a sum of all pixel values in said iris area, said facial feature detector then calculating an iris merit value at each of said different locations according to a formula:

Iris Merit Value=(2×white-area value)−(3×eyelid value)−(6×iris value)

said facial feature detector then selecting a maximum iris merit value to accurately detect coordinates of said iris area; and
- a processor configured to control said facial feature detector to thereby effectively analyze said image data.

21. A method for effectively analyzing image data, comprising the steps of:
- analyzing said image data with a facial feature detector to generate facial feature information, said facial feature information including eye-area information and mouth-area information, said facial feature detector performing an eye-area vertical projection procedure for generating said eye-area information, said facial feature detector also separately performing a mouth-area vertical projection procedure for generating said mouth-area information;
- utilizing a feature filter to refine said facial feature information for a facial feature, said feature filter having a plurality of segments that collectively are shaped to represent said facial feature, said facial feature detector moving said feature filter over pixels of said image data to repeatedly calculate feature merit values from said pixels currently aligned with said feature filter, said feature merit values being determined by calculating sums of pixel values corresponding with each of said segments and then calculating a weighted difference of said sums, an optimal one of said feature merit values accurately locating said facial feature in said image data; and
- controlling said facial feature detector with a processor to thereby effectively analyze said image data.

22. The method of claim 21 wherein a face detector module performs an initial face detection procedure to convert said image data into a gray-scale format, said face detector module then generating approximate location information for a subject face in said image data.

23. The method of claim 22 wherein said facial feature detector performs a face rotation procedure upon said subject face in said image data to realign said subject face in a vertical alignment.

24. The method of claim 23 wherein said facial feature detector calculates rotated coordinates for pixels in said subject face by utilizing a rotation matrix formula:

$$\begin{bmatrix} X_2 \\ Y_2 \end{bmatrix} = \begin{bmatrix} \cos\theta & -\sin\theta \\ \sin\theta & \cos\theta \end{bmatrix} \begin{bmatrix} X_1 \\ Y_1 \end{bmatrix}$$

where $X_1$ and $Y_1$ are non-rotated coordinates in a non-vertical face window, $X_2$ and $Y_2$ are said rotated coordinates in a vertical face window, and $\theta$ is an angle of rotation, said facial feature detector decomposing said rotation matrix formula into a series of three one-dimensional translations according to a decomposed formula:

$$\begin{bmatrix} \cos\theta & -\sin\theta \\ \sin\theta & \cos\theta \end{bmatrix} = \begin{bmatrix} 1 & -\tan\frac{\theta}{2} \\ 0 & 1 \end{bmatrix} \begin{bmatrix} 1 & 0 \\ \sin\theta & 1 \end{bmatrix} \begin{bmatrix} 1 & -\tan\frac{\theta}{2} \\ 0 & 1 \end{bmatrix}$$

where a first matrix moves said pixels in an initial horizontal direction, a second matrix moves said pixels in a vertical direction, and a third matrix again moves said pixels in a final horizontal direction.

25. The method of claim 24 wherein said facial feature detector creates an mouth-area window around an approximate mouth-area in said subject face, said mouth-area window including a nose and a mouth.

26. The method of claim 25 wherein said facial feature detector performs said mouth-area vertical projection procedure by summing gray-scale values of pixels in each horizontal line of said mouth-area window to produce a corresponding histogram which represents results of said mouth-area vertical projection procedure, said facial feature detector identifying a first low-amplitude point in said histogram as corresponding to pixels of a nostril region in said subject face, said facial feature detector also identifying a central second low-amplitude point in said histogram as corresponding to pixels of an upper lip region in said subject face, said facial feature detector further identifying a third low-amplitude point in said histogram as corresponding to pixels of a lower lip region in said subject face.

27. The method of claim 25 wherein said facial feature detector performs said mouth-area vertical projection procedure by summing gray-scale values of pixels in each horizontal line of said mouth-area window to produce a corresponding histogram which represents results of said mouth-area vertical projection procedure, said facial feature detector identifying a first low-amplitude point in said histogram as corresponding to pixels of a nostril region in said subject face, said facial feature detector also identifying a second low-amplitude point in said histogram as corresponding to pixels of a closed-mouth region in said subject face.

28. The method of claim 23 wherein said facial feature detector creates an eye-area window around an approximate eye area in said subject face, said eye-area window including an eye and an eyebrow.

29. The method of claim 28 wherein said eye-area window is implemented with a width of "M" and a height of "M" where "M" is an approximate distance between eye areas in said subject face.

30. The method of claim 28 wherein said facial feature detector performs said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face.

31. The method of claim 30 wherein said facial feature detector utilizes an eyebrow filter to detect an upper edge and a slope angle of said eyebrow from said subject face.

32. The method of claim 31 wherein said eyebrow filter is implemented to have a filter width of "M" and a filter height of "M/4", where "M" is an approximate distance between two eyes of said subject face.

33. The method of claim 30 wherein said facial feature detector utilizes an iris filter to detect coordinates for an iris region in said eye-area of said subject face.

34. The method of claim 28 wherein said histogram exhibits only one low-amplitude point, said facial feature detector then identifying said one low-amplitude point as corresponding to said eye region of said subject face.

35. The method of claim 21 wherein a face recognition module performs a face recognition procedure for two faces by calculating absolute differences between corresponding facial feature parameters, said face recognition module next applying weighting values to said absolute differences to produce weighted differences, said face recognition module then calculating a final sum of said weighted differences, said face recognition module utilizing said final sum as a score to measure a similarity between said two faces, said facial parameters including a distance between irises in a subject face which is normalized and rescaled to a standard size, an averaged eyebrow angle from eyebrows of said subject face, a distance between corresponding eyebrows and irises of said subject face, and a distance between an eyeline connecting two irises of said subject face and a mouth from said subject face.

36. A method for effectively analyzing image data, comprising the steps of:
analyzing said image data with a facial feature detector to generate facial feature information, said facial feature information including eye-area information and mouth-area information, said facial feature detector performing an eye-area vertical projection procedure for generating said eye-area information, said facial feature detector also separately performing a mouth-area vertical projection procedure for generating said mouth-area information;
utilizing a feature filter to refine said facial feature information for a facial feature, said feature filter having a plurality of segments that collectively are shaped to represent said facial feature, said facial feature detector moving said feature filter over pixels of said image data to repeatedly calculate feature merit values from said pixels currently aligned with said feature filter, an optimal one of said feature merit values accurately locating said facial feature in said image data; a face detector module performing an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector determining a correct separator area between said first low-amplitude point and said second low-amplitude point by selecting a maximum separator merit value of separator area candidates according to a formula:

Merit Value=Separator Candidate Value−10 (Eyebrow Value−Eye Value);

and controlling said facial feature detector with a processor to thereby effectively analyze said image data.

37. A method for effectively analyzing image data, comprising the steps of:

analyzing said image data with a facial feature detector to generate facial feature information, said facial feature information including eye-area information and mouth-area information, said facial feature detector performing an eye-area vertical projection procedure for generating said eye-area information, said facial feature detector also performing a mouth-area vertical projection procedure for generating said mouth-area information;

utilizing a face detector module to perform an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector utilizing an eyebrow filter to detect an upper edge and a slope angle of said eyebrow from said subject face, said eyebrow filter being implemented to have a filter width of "M" and a filter height of "M/4", where "M" is an approximate distance between two eyes of said subject face, said facial feature detector moving said eyebrow filter, pixel by pixel, to different locations of said eyebrow region in said eye-area window, said facial feature detector, at each of said different locations, adding all pixel values in an upper portion of said eyebrow filter to produce an upper value, said facial feature detector also adding all pixel values in a lower portion of said eyebrow filter to produce a lower value, said facial feature detector then subtracting said lower value from said upper value to produce a local eyebrow value for each corresponding position of said eyebrow filter, said facial feature detector then selecting a maximum local eyebrow value to accurately detect a position and a slope angle of a corresponding eyebrow; and controlling said facial feature detector with a processor to thereby effectively analyze said image.

38. The method of claim 37 wherein said facial feature detector tilts said eyebrow filter to calculate tilted local eyebrow values, said facial feature detector then selecting a maximum tilted local eyebrow value to accurately detect said slope angle of said eyebrow.

39. A method for effectively analyzing image data, comprising the steps of:

analyzing said image data with a facial feature detector to generate facial feature information, said facial feature information including eye-area information and mouth-area information, said facial feature detector performing an eye-area vertical projection procedure for generating said eye-area information, said facial feature detector also performing a mouth-area vertical projection procedure for generating said mouth-area information;

utilizing a face detector module to perform an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector utilizing an iris filter to detect coordinates for an iris region in said eye-area of said subject face, said iris filter being implemented to include an iris area with an iris radius "r" that is approximately equal to 0.09×"M", where "M" is an approximate distance between eyes in said subject face, said iris filter also being implemented with a pupil area having a pupil radius that is approximately equal to "r/2", where "r" is said iris radius, said iris filter further being implemented with a eye-white area having an eye-white radius that is approximately equal to "1.5×r", where "r" is said iris radius; and controlling said facial feature detector with a processor to thereby effectively analyze said image data.

40. A method for effectively analyzing image data, comprising the steps of:

analyzing said image data with a facial feature detector to generate facial feature information, said facial feature information including eye-area information and mouth-area information, said facial feature detector performing an eye-area vertical projection procedure for generating said eye-area information, said facial feature detector also performing a mouth-area vertical projection procedure for generating said mouth-area information;

utilizing a face detector module to perform an initial face detection procedure to convert said image data into a gray-scale format, said face detector module then generating approximate location information for a subject face in said image data, said facial feature detector performing a face rotation procedure upon said subject face in said image data to realign said subject face in a vertical alignment, said facial feature detector creating an eye-area window around an approximate eye area in said subject face, said eye-area window including an eye and an eyebrow, said facial feature detector performing said eye-area vertical projection procedure by summing gray-scale values of pixels in each horizontal line of said eye-area window to produce a corresponding histogram which represents results of said eye-area vertical projection procedure, said facial feature detector identifying a first low-amplitude point in said histogram as corresponding to pixels of an eyebrow region in said subject face, said facial feature detector also identifying a second low-amplitude point in said histogram as corresponding to pixels of an eye region in said subject face, said facial feature detector utilizing an iris filter to detect coordinates for an iris region in said eye-area of said subject face, said facial feature detector moving said iris filter, pixel by pixel, to different locations in an eye-area window around said eye area, said facial feature detector, at each of said different locations, generating a white-area value that is equal to a sum all pixel values in said eye-white area of said iris filter, said facial feature detector also generating an eyelid value that is equal to a sum all pixel values in an eyelid area of said iris filter, said facial feature detector further generating an iris value that is equal to a sum of all pixel values in said iris area, said facial feature detector then calculating an iris merit value at each of said different locations according to a formula:

Iris Merit Value=(2×white-area value)−(3×eyelid value)−(6×iris value)

said facial feature detector then selecting a maximum iris merit value to accurately detect coordinates of said iris area; and controlling said facial feature detector with a processor to thereby effectively analyze said image data.

41. A computer-readable medium comprising program instructions for effectively analyzing image data by performing the steps of:

analyzing said image data with a facial feature detector to generate facial feature information, said facial feature information including eye-area information and mouth-area information, said facial feature detector performing an eye-area vertical projection procedure for generating said eye-area information, said facial feature detector also performing a mouth-area vertical projection procedure for generating said mouth-area information;

utilizing a feature filter to refine said facial feature information for a facial feature, said feature filter having a plurality of segments that collectively are shaped to represent said facial feature, said facial feature detector moving said feature filter over pixels of said image data to repeatedly calculate feature merit values from said pixels currently aligned with said feature filter, said feature merit values being determined by calculating sums of pixel values corresponding with each of said segments and then calculating a weighted difference of said sums, an optimal one of said feature merit values accurately locating said facial feature in said image data; and controlling said facial feature detector with a processor to thereby effectively analyze said image data.

42. A system for effectively analyzing image data, comprising:

means for analyzing said image data to generate facial feature information, said facial feature information said facial feature information including eye-area information and mouth-area information, said means for analyzing performing an eye-area vertical projection procedure for generating said eye-area information, said means for analyzing also performing a mouth-area vertical projection procedure for generating said mouth-area information;

means for refining said facial feature information for a facial feature, said means for refining having a plurality of segments that collectively are shaped to represent said facial feature, said means for analyzing moving said means for refining over pixels of said image data to repeatedly calculate feature merit values from said pixels currently aligned with said means for refining, said feature merit values being determined by calculating sums of pixel values corresponding with each of said segments and then calculating a weighted difference of said sums, an optimal one of said feature merit values accurately locating said facial feature in said image data; and means for controlling said facial feature detector to thereby effectively analyze said image data.

* * * * *